US008973982B2

(12) United States Patent
Tabuteau et al.

(10) Patent No.: US 8,973,982 B2
(45) Date of Patent: Mar. 10, 2015

(54) MOTOR VEHICLE CHASSIS WITH LATERAL SEAT-CUSHION SUPPORT REINFORCEMENT

(75) Inventors: Pascal Tabuteau, Montigny le Bretonneux (FR); Thomas Mauduit, Voisins le Bretonneux (FR); Olivier Bisror, Le Plessis Robinson (FR)

(73) Assignee: Renault S.A.S., Boulogne-Billancourt (FR)

( * ) Notice: Subject to any disclaimer, the term of this patent is extended or adjusted under 35 U.S.C. 154(b) by 93 days.

(21) Appl. No.: 13/811,777

(22) PCT Filed: Jul. 11, 2011

(86) PCT No.: PCT/FR2011/051646
§ 371 (c)(1),
(2), (4) Date: Apr. 4, 2013

(87) PCT Pub. No.: WO2012/010772
PCT Pub. Date: Jan. 26, 2012

(65) Prior Publication Data
US 2013/0181483 A1    Jul. 18, 2013

(30) Foreign Application Priority Data

Jul. 23, 2010  (FR) ...................................... 10 56045

(51) Int. Cl.
*B62D 25/20*   (2006.01)
*B60N 2/01*    (2006.01)
*B62D 25/02*   (2006.01)

(52) U.S. Cl.
CPC ............ *B62D 25/2009* (2013.01); *B60N 2/012* (2013.01); *B62D 25/025* (2013.01); *B62D 25/2036* (2013.01)
USPC ......... 296/203.03; 296/63; 296/204; 296/209

(58) Field of Classification Search
USPC ......... 296/63, 65.01, 187.08, 187.12, 193.05, 296/193.07, 203.03, 204, 209, 29, 30
See application file for complete search history.

(56) References Cited

U.S. PATENT DOCUMENTS 4,451,078 A * 5/1984 Maeda ...................... 296/187.12
4,572,571 A * 2/1986 Malen ...................... 296/193.07
(Continued)

FOREIGN PATENT DOCUMENTS

EP     0 619 215     10/1994
JP     3 28087       2/1991

OTHER PUBLICATIONS

International Search Report Issued Oct. 7, 2011 in PCT/FR11/51646 Filed Jul. 11, 2011.
(Continued)

*Primary Examiner* — Gregory Blankenship
(74) *Attorney, Agent, or Firm* — Oblon, McClelland, Maier & Neustadt, L.L.P.

(57) ABSTRACT

A motor vehicle chassis includes two lateral floor supports and a seat-cushion support part positioned between two lateral raisers fixed on top of the lateral floor supports and assembled with the lateral floor supports. The chassis further includes two seat-cushion support reinforcements each assembled with a lateral floor support and with a lateral raiser, each seat-cushion support reinforcement including: a substantially horizontal plate extending the seat-cushion support part laterally, assembled with the lateral raiser along a substantially vertical mating edge of the plate, and a single support leg extending downwards from the plate, assembled with the lateral floor support, and the assembly end of which is positioned vertically below the plate, some distance from a projection onto the horizontal of the mating edge.

9 Claims, 3 Drawing Sheets

(56) References Cited

U.S. PATENT DOCUMENTS

| | | | | |
|---|---|---|---|---|
| 5,110,176 A | * | 5/1992 | Curtis | 296/187.12 |
| 5,352,011 A | * | 10/1994 | Kihara et al. | 296/203.03 |
| 5,829,824 A | * | 11/1998 | Yamamuro et al. | 296/204 |
| 5,921,618 A | * | 7/1999 | Mori et al. | 296/187.12 |
| 6,045,174 A | * | 4/2000 | Brancaleone et al. | 296/63 |
| 7,644,978 B2 | * | 1/2010 | Tosaka et al. | 296/187.12 |
| 7,658,440 B2 | * | 2/2010 | Tohda et al. | 296/204 |
| 8,176,360 B2 | * | 5/2012 | Frost et al. | 714/6.24 |
| 8,567,857 B2 | * | 10/2013 | Fujii et al. | 296/204 |
| 2013/0181483 A1 | * | 7/2013 | Tabuteau et al. | 296/193.02 |
| 2013/0257097 A1 | * | 10/2013 | Kojo et al. | 296/187.08 |

OTHER PUBLICATIONS

French Search Report Issued Mar. 28, 2011 in FR 1056045 Filed Jul. 23, 2010.
U.S. Appl. No. 13/811,761, filed Mar. 12, 2013, Bisror et al.
U.S. Appl. No. 13/811,762, filed Apr. 2, 2013, Tabuteau et al.
U.S. Appl. No. 13/811,808, filed Apr. 4, 2013, Mauduit et al.
U.S. Appl. No. 13/811,750, filed Mar. 21, 2013, Bisror et al.

* cited by examiner

MOTOR VEHICLE CHASSIS WITH LATERAL SEAT-CUSHION SUPPORT REINFORCEMENT

BACKGROUND

The invention falls within the field of chassis for motor vehicles, notably electrically powered or hybrid vehicles. In order to ensure that electrically powered or hybrid vehicles have sufficient range, accumulator batteries have to be carried on board. The volume of these batteries is substantially greater than the volume occupied by a conventional energy reserve, for example a fuel tank.

One solution is to make use of a volume delimited under the passenger seat, by modifying the profile of the floor so as to isolate this volume from the passenger compartment. The passenger seat then rests directly on a raised region of the floor. The height of the seat may be the same as the height of the seat in vehicles of the same range built to be powered by a combustion engine, or may be higher.

Patent application JP 07 156 826 thus describes a chassis structure for an electrically powered motor vehicle, in which structure a volume under the front and rear passenger seats is set aside for the battery by separating this volume from the passenger compartment. Vertical raiser plates are positioned at the front and at the rear of the seats. A raised floor seating region extends from the front backward between these vertical raiser plates and extends laterally between lateral raiser supports which are fixed to the lateral flanks of the bodywork.

Such a structure cannot be applied to a three-door vehicle because the rear passenger seats need to be flanked by fixed bodywork flanks, to which the lateral raiser supports are assembled. Further, where there is a desire to offer the same vehicle in an electrically powered version and in a combustion-engine powered version, the line of spot welds used for assembling the floor elements to the chassis frame side members of the vehicle may not follow the same geometry for the electric vehicle as for the combustion engine vehicle. This then forces the need, in order to produce the two vehicles to install two separate welding lines, thus increasing both development and production costs.

BRIEF SUMMARY

It is an object of the invention to propose a chassis geometry for an electric vehicle or for some other vehicle requiring an energy reserve volume that is higher than conventional fuel tanks. Another object of the invention is to propose a chassis geometry that allows electrically powered vehicles and combustion-engine-powered vehicles to be produced in parallel, using a high number of components and production facilities in common.

The invention thus proposes a motor vehicle chassis which comprises two lateral floor supports and a seat-cushion support part positioned between two lateral raisers fixed on top of the lateral floor supports and assembled with the lateral floor supports. The chassis comprises two seat-cushion support reinforcers each assembled with a lateral floor support and with a lateral raiser, each seat-cushion support reinforcer comprising:

a substantially horizontal plate extending the seat-cushion support part laterally and assembled with the lateral raiser along a substantially vertical mating edge of the plate, and a single supporting leg extending downward from the plate, assembled with the lateral floor support and the assembly end of which is positioned in vertical alignment with the plate some distance from a projection onto the horizontal of the mating edge.

The plate may thus serve to support the lateral parts of a seat-cushion padding foam placed on the seat-cushion support part.

Advantageously, one or more relief(s) able to stiffen the edge of the plate run around the outline of the plate. The mating edge preferably has passing through it at least two assembly orifices allowing the plate to be assembled with one or more horizontal supports.

For preference, the lateral raisers are substantially parallel to the longitudinal median plane of the vehicle, and the mating edge of the plate is substantially parallel to the mean plane of the leg.

The mean plane of the leg is therefore likewise parallel to the longitudinal median plane of the vehicle. The leg can thus stiffen the plate in terms of bending in a longitudinal direction of the vehicle.

For preference, the assembly end of the leg has passing through it an assembly orifice substantially perpendicular to the mating edge.

The assembly orifice is thus substantially perpendicular to the longitudinal median plane of the vehicle making it easier to access when the leg is being assembled with the lateral floor support.

According to one advantageous embodiment, the plate is made of sheet metal and the periphery of the plate comprises one or more stiffening relief(s) in the form of a turned-down edge and/or in the form of a pressed channel running around the periphery of the sheet. The plate can thus be produced at low cost by pressing a thin sheet.

The plate may comprise a pressed channel along the mating edge. The channel then constitutes a region of improved stiffness, which can be pierced with assembly holes positioned at a suitable distance from the mating edge. The suitable distance means a distance that allows the plate to be screwed to fittings placed square to the lateral raisers. The plate may have turned-down edges along its edges other than the mating edge.

Such a relief is easy to obtain by pressing, contributes to the stiffness of the plate, and makes it possible to obtain a rounded edge which will limit the concentration of stresses that might risk cutting into a seat-cushion padding foam resting on the plate. It is also possible to conceive of alternative forms of embodiment in which the plate comprises turned-down edges around its entire periphery. The height of the turned-down edge may, for example, be between 5 and 20 mm. The depth of the channel may, for example, be between 5 and 20 mm.

The leg may also be made of sheet metal, the width of the leg reducing between the plate and the assembly end.

In order to limit the consumption of material and the leg may be stiffened by bends in the sheet metal, for example parallel to the edges of the leg.

According to one advantageous embodiment the sheet metal leg is bent into an angle bracket shape, the upper part of the angle bracket shape being secured to the surface of the plate.

The plate may have a canted region that is superelevated with respect to a first mean plane of the plate along a line perpendicular to the mating edge. The canted region may for example be a portion of cylindrical surface of axis perpendicular to the mating edge. The plate may thus extend a relief transverse to the vehicle of the seat-cushion support part, this relief making it possible to limit the fore and aft slippage of a seat-cushion padding foam placed on the seat-cushion support and on the two lateral seat-cushion support reinforcers.

For preference the reinforcer is assembled with the lateral raiser and with the lateral floor support by at least two bent sheet metal fittings, each having a pre-assembly first face able to be secured to the lateral raiser or to the lateral floor support, and a second face, substantially perpendicular to the first face, able to come into contact with a plane of the reinforcer.

According to a preferred embodiment, the leg is assembled with the lateral floor support by a fitting bent at a right angle, and is assembled with the lateral raisers by fittings which may be bent to form angles of between 82 and 88°.

The plate, the leg and the fittings may be made from the same steel sheet 0.4 mm to 1 mm thick, for example a steel sheet 0.65 mm thick. This then simplifies the sourcing of material for the manufacture of the reinforcer plus fittings assembly.

Advantageously, the plate has a slot of a width greater than the width of a seat belt of the vehicle. The plate may thus contribute to guiding a seat belt stretched for example between the lateral floor support and the top of the seat. It is also possible to conceive of alternative forms of embodiment in which the seat-cushion support reinforcer is made of injection-molded plastic, the plate and the leg being molded as a single piece. In this embodiment, the plate may have reinforcing ribs distributed over its underside surface, rather than simply running along the outline of the plate. The leg, instead of being flat overall, may be made up of several layers converging toward one another along one or more vertical axes, so as to exhibit a "star-shaped" or a "comb-shaped" horizontal cross section. The assembly end of the leg may in that case have no assembly orifice and for example be inserted into a cup-like support likewise molded, screwed by its central part to the lateral floor support and limiting the horizontal movements of the leg.

BRIEF DESCRIPTION OF THE DRAWINGS

The present invention will more readily understood from reading the detailed description of a number of embodiments taken by way of entirely nonlimiting examples and illustrated by the attached drawings in which.

DETAILED DESCRIPTION

Figure 1:
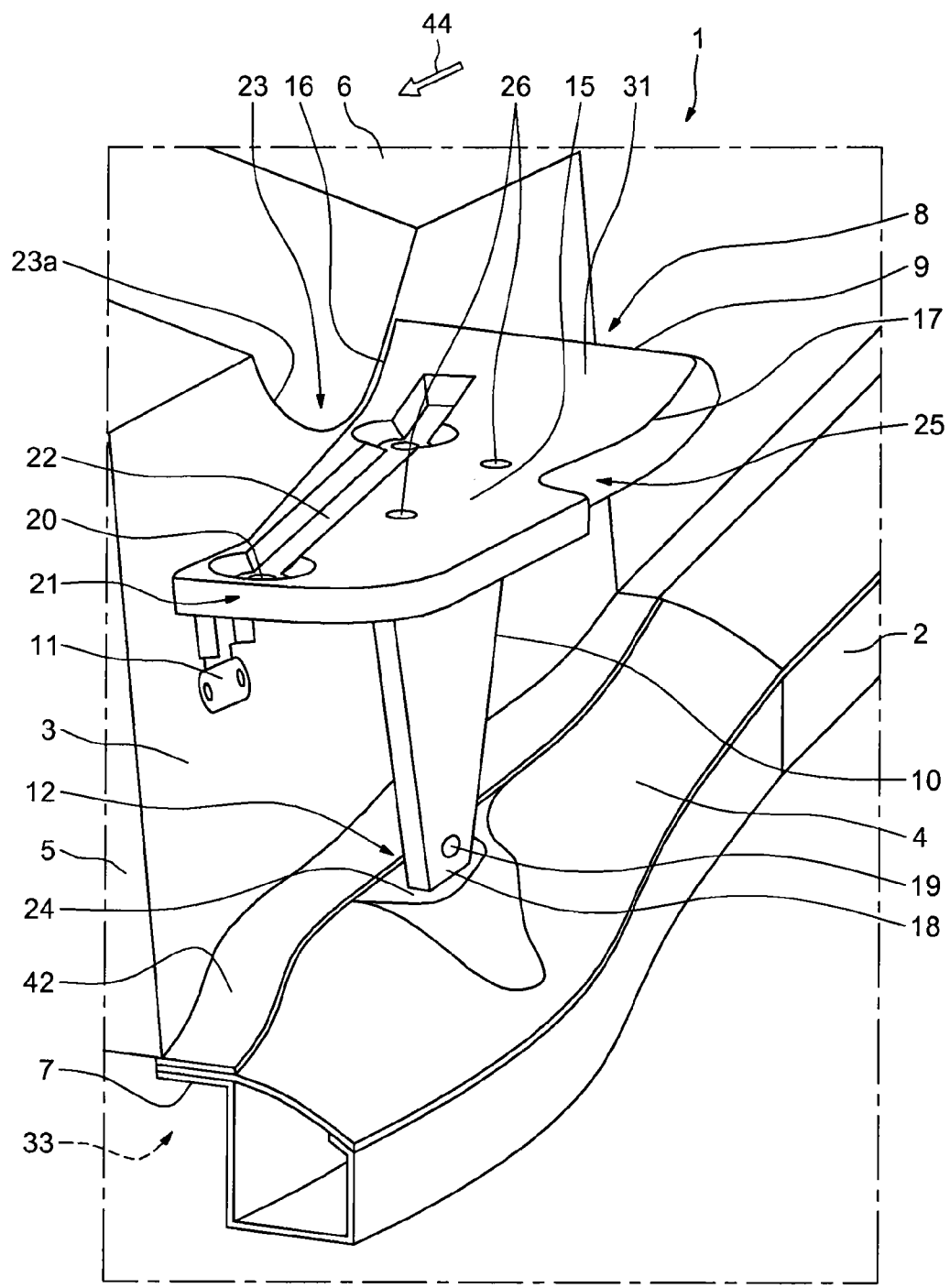
FIG. 1 is a partial perspective view of a chassis according to the invention.

As illustrated in FIG. 1, a vehicle chassis 1 comprises a left-side lateral portion and a right-side lateral portion which are symmetric with one another about a longitudinal median plane of the vehicle. Only the left-side lateral portion has been depicted in FIG. 1, the arrow 44 indicating a direction from the rear of the vehicle (not depicted) forward. The left-side lateral portion comprises a left chassis frame side member 2, consisting of a U-section beam. The dimensions of the U-section vary from the front toward the rear of the chassis frame side member and the ends of the U are bent over to define two chassis frame side member longitudinal flanges to which other sheet-metal chassis components can be assembled by welding. The chassis frame side member 2 is covered on its front part with a lateral floor support 4. The lateral floor support 4 consists of a sheet of substantially horizontal direction assembled by welding to each of the flanges of the chassis frame side member 2, namely to the internal flange 7 closest to the axis of the vehicle, and to the external flange.

An internal flange of the lateral floor support 4 on the one hand, and a lower flange of a lateral raiser 3 on the other hand, are assembled on the internal flange of the chassis frame side member 2. The lateral raiser 3 consists of a substantially vertical portion of sheet metal directed along the longitudinal axis of the vehicle, possibly slightly inclined toward the longitudinal median plane of the vehicle.

On top of the two left and right lateral raisers 3 is placed a substantially horizontal component 6 acting as a seat-cushion support. The seat-cushion support piece 6 may for example be made of pressed sheet metal, but alternative forms of embodiment using other materials, such as fiber-reinforced polymer composites are conceivable. The seat-cushion support piece 6 is located between the internal edges 7 of the two lateral floor supports 4. The seat-cushion support sheet 6 is bounded right and left by the planes of the two lateral raisers with which it is contiguous. Toward the front of the vehicle the seat-cushion support sheet 6 continues in the form of a forward panel 5, consisting of a portion of the same metal sheet folded over downward from the horizontal portion 6 that constitutes the seat-cushion support. The forward panel 5 extends likewise between the internal edges of the lateral floor supports 4. The horizontal part of the seat-cushion support sheet 6 is crossed, in the direction transverse to the vehicle, by an indentation 23 the right and left ends of which define the outlines of slots 23a formed in the upper parts of the lateral raisers 3. This indentation allows a slab 13 of seat-cushion padding foam to be assembled on the seat-cushion support 6 while at the same time limiting the propensity of this foam to slide forward or backward in the vehicle.

Assembled with the flank of each seat-cushion support piece 3 is a plate 9 of a seat-cushion support reinforcer 8. The plate 9 extends the seat-cushion support 6 laterally in a plane that is slightly set back, and this allows a seat slab wider than the support itself to be rested on this seat-cushion support and, in particular, allows the fitting of a bench seat slab that is wider than the space separating the internal edges 7 of the chassis frame side members 2.

The plate 9 is in contact with the lateral raiser 3 along a mating edge 16 of the plate. It is assembled with the lateral raiser 3 by fittings 11, preferably screwed both to the plate 9 and to the lateral raiser 3. The plate 9 is supported by a leg 10, assembled with the plate 9 by screws or spot welds 26. The leg 10 is made up of a substantially trapezoidal portion of sheet metal, the width of which decreases in the direction away from the plate. The leg 10 ends at its lower end in an assembly end 18 pierced with an assembly orifice 19 and which is secured by a fitting 12 (hidden by the leg 10 in FIG. 1) to the lateral floor support 4.

The mean plane of the leg 10 is substantially parallel to the longitudinal median plane of the vehicle. The substantially vertical orientation of the leg 10 allows it with maximum effectiveness to transfer the vertical load applied to the plate 9 to the lateral floor supports 4. It is thus possible to permit a minimum use of material from which to make the leg 10. By orienting the plane of the leg 10 along the longitudinal axis of the vehicle, the leg becomes easier to assemble by transverse screwing to the fitting 12. This is because the tightening of the screw that connects the assembly end 18 and the fitting 12 is done in a direction that is particularly accessible, being perpendicular to the median plane of the vehicle. This orientation of the leg also means that the greater width of the leg can be used to stiffen the plate in terms of fore and aft bending.

The plate 9 comprises a central surface 15 which is bounded on the one hand by the mating edge 16 and on the other hand by an outline curve 17 joining the ends of the mating edge 16. The plate 9 has a pressed channel 22 that runs around the mating edge 16 and stiffens this edge in terms of bending. Along the outline curve 17, the sheet metal of which the plate 9 is formed is pressed in such a way as to define turned-down edges 21 that are directed downward. These turned-down edges further contribute to the overall flexural stiffness of the plate 9. The outline curve 17 and the turned-down edge 21 comprise a slot 25 the width of which is great enough that the slot 25 can accommodate a seat belt stretched substantially perpendicular to the plate 9.

The plate 9 has a canted portion 31 which is superelevated toward the rear of the vehicle so that the longitudinal section of the plate at least partially hugs the slot 23a in the lateral raiser 3. It is possible to conceive of alternative forms of embodiment with a plate 9 having a planar top surface or, on the other hand, with a plate 9 having a dished profile so that it follows the outline of the slot 23a and the lateral raiser, on each side of its lowermost point.

The end of the vertical leg 10 is assembled, with respect to the transverse direction of the vehicle, more or less in the middle of the central surface 15 of the plate 9. Thus, the leg 9 allows vertical load transmitted to the plate 9 to be transferred effectively while at the same time maintaining the raised structure of the seats which are independent of the lateral vehicle bodywork panels.

Because of this position, the assembly end 18 of the leg 10 remains relatively close, in the transverse direction of the vehicle, to the internal edge 7 of the chassis frame side member 2. It so happens that along this internal edge 7, the lateral floor support 4 has a strip 42 of substantially horizontal surface intended to allow the chassis frame side member 2, the lateral floor support 4 and the lateral raiser 3 to be assembled as a three-thickness weld. If this strip 42 of horizontal surface is sufficiently wide, the assembly fitting 12 for the leg 10 may be fixed to it. If not, a relief 24 may be pressed into the lateral floor support 4 near this strip 42, so as locally to widen the horizontal surface 42 internally flanking the floor support 4.

It is thus conceivable to use the same floor support geometry as an initial geometry already used for creating vehicles that have no seat-cushion support reinforcer.

If, in this initial geometry, the width of the strip 42 is not enough for the fitting 12 for the assembly of the leg 10 to be fixed directly to it, it is then a relatively inexpensive matter to press a relief 24 into the existing lateral floor support.

The upper part 6 of the seat-cushion support sheet and the forward plate 5 as well as the two lateral raisers 3, together define a volume 33, situated under the passenger seats, and separated from the passenger compartment of the vehicle. Accumulator batteries or other forms of energy reserve (pressurized liquid fuel tank, etc.) and/or management means (control electronics, valves, etc.) for such reserves of energy, for example can then be housed in this volume 33. The volume 33 thus defined is located in the central part of the vehicle, away from the doors or the right and left side bodywork panels of the vehicle. Thus, the structure supporting the seats and notably comprising the lateral raisers 3 and the seat-cushion support sheet 6, remains independent of the lateral edges of the bodywork. This type of housing for energy reserve can also suit a three-door vehicle as well as it does a five-door vehicle.

Further, it is possible to use certain parts of the chassis described both for a conventionally combustion-engine powered vehicle and for an electrically powered vehicle. Thus, the chassis frame side members 2 and the lateral floor supports 4 may be common to both vehicles. The internal edges 7 of the chassis frame side members then support either a conventional vehicle floor positioned in the continuation of the lateral floor supports (in the case of a combustion-engine powered vehicle) or (in the case of an electrically powered vehicle), a raised central floor portion assembled with the flanges 7 via the lower parts of the lateral raisers 3.

One and the same welding installation can thus be used for alternately assembling either raised floors or non-raised floors, the route of the welding line remaining the same along the flange 7. The process of manufacturing the lateral floor supports differs only in terms of the pressing of the relief 24 used for fixing the fitting 12.

The process of manufacture of lateral floor supports is thus modified slightly. By contrast, the expensive part of the assembly line which notably comprises the line used for assembling and welding the central part of the floor to the lateral floor supports 4 and the internal edges 7 of the chassis frame side members is kept the same.

The positions of the fittings 11 and 12 for assembling the reinforcer allow these fittings to be assembled firstly to the chassis by welding or by screwing and secondly to the seat-cushion support reinforcer 8 by welding, screwing or riveting. The assembly zone is accessed in each instance either vertically or horizontally from outside the chassis. The assembly method is thus particularly simple.

Figure 2:
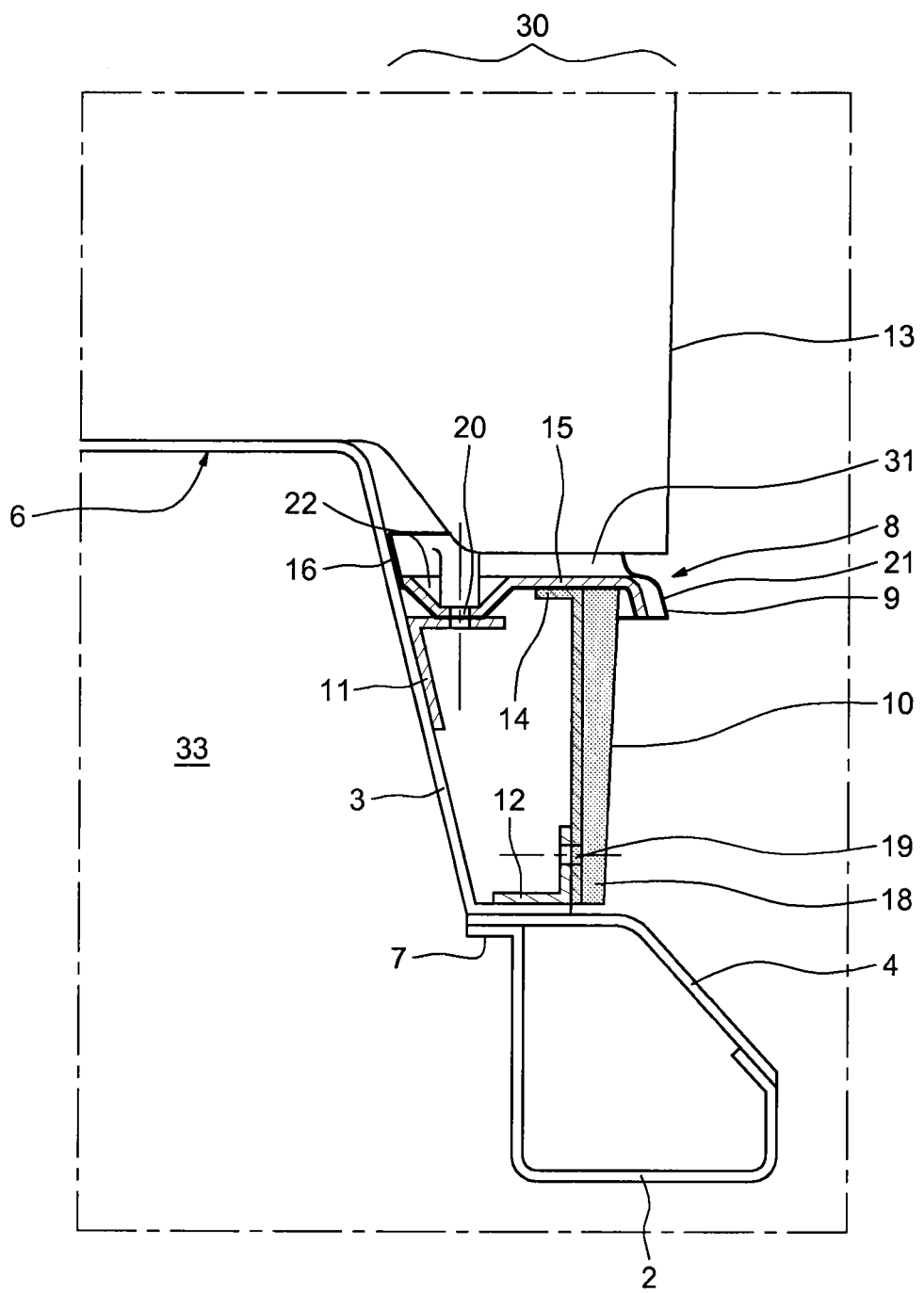
FIG. 2 is a view in cross section of an element of the chassis of FIG. 1.

FIG. 2 is a view in cross section of the seat-cushion support reinforcer 8. FIG. 2 again shows elements in common with FIG. 1, the same elements therefore being denoted by the same references. FIG. 2 also depicts a block 13 of seat-cushion padding foam that constitutes the lower part of a bench seat for the rear-seat passengers of the vehicle. The seat cushion padding foam 13 is rested, in the central part of the bench, on the horizontal part of the seat-cushion support 6, and in the indentation 23 of this seat-cushion support. The seat-cushion padding foam 13 has an overhanging region 30 which juts out from the seat-cushion support 6 to the right and to the left of this seat-cushion support.

Because the seat-cushion padding foam 13 is a support component of reduced structural rigidity, it could collapse were a passenger to rest against the far right or left edge of the bench seat. To avoid such collapse, the jutting-out portion 30 rests on the plate 9 of the seat-cushion support reinforcer 8.

Figure 3:
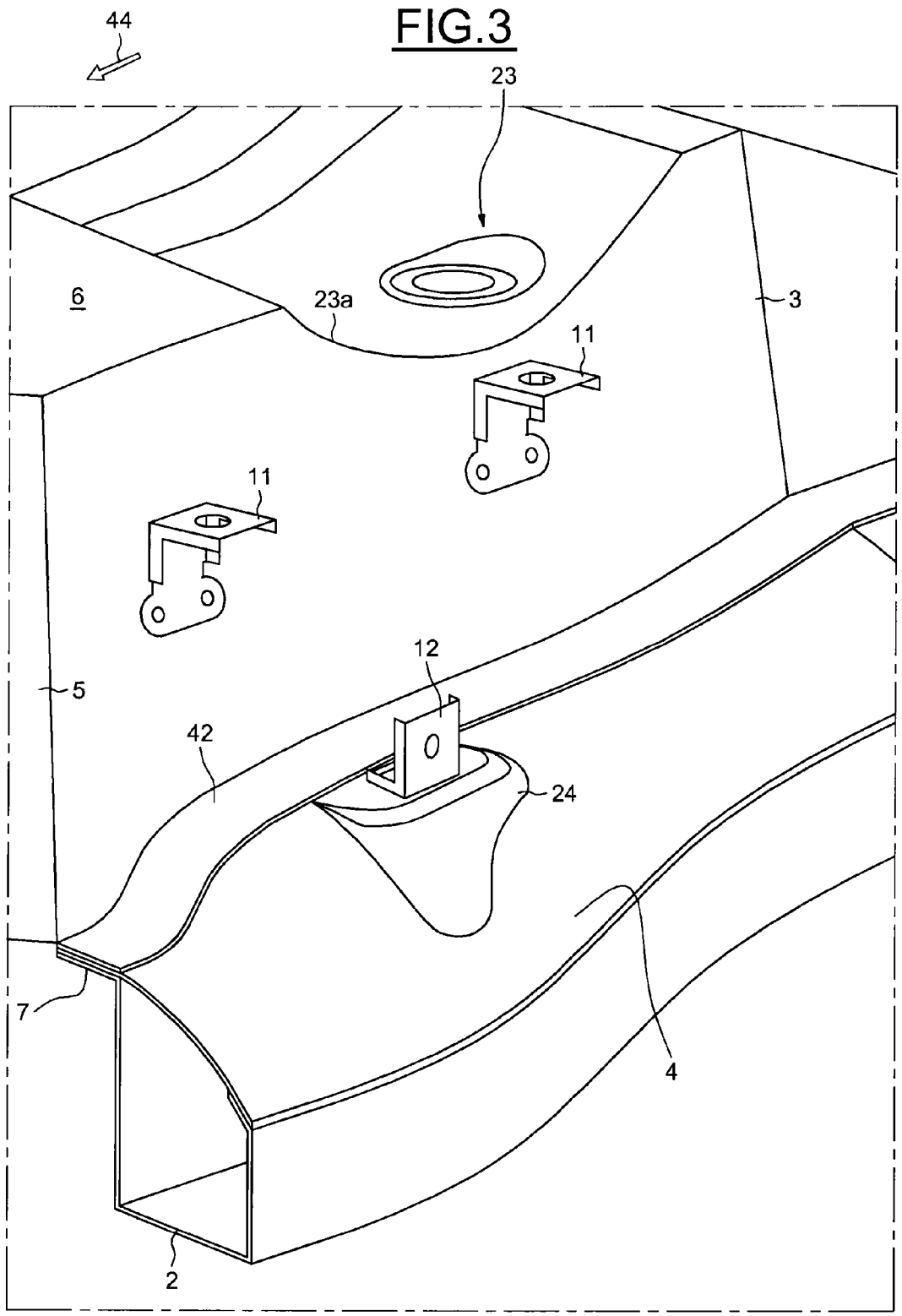
FIG. 3 is a perspective view of the assembly points of the chassis of FIGS. 1 and 2, to which points the element of FIG. 2 is assembled.

FIG. 3 is a perspective illustration of the chassis portion already described in FIGS. 1 and 2, prior to assembly of the seat-cushion support reinforcer 8. FIG. 3 notably gives as better view of how the assembly fittings 11 and 12 are arranged and of the relief 24 that allows the fitting 12 to be assembled. FIG. 3 again shows elements that are common to FIGS. 1 and 2, and the same elements are therefore denoted by the same references.

Thanks to the arrangement described above, a volume 33 is made available under the seats of the rear-seat passengers, in which volume a reserve of energy such as a bank of accumulator batteries, or a pressurized fuel tank, can be housed. The assembly proposed makes it possible to enjoy a seat support structure that is independent of the lateral edges of the bodywork is as suited to a 3-door vehicle as it is to a 5-door vehicle. The structure of the seat-cushion support reinforcers means that the entire bench seat can be supported simply through the addition of two components that are inexpensive to manufacture and that can be assembled with the chassis in a simple way. The vehicle that benefits from the additional storage volume can be produced on the same production lines as a similar vehicle with a floor that has not been raised with very little modification to the assembly process. This then reduces the costs of developing and producing new, electrically powered or alternatively-powered vehicles. The invention is not restricted to the particular example described in FIGS. 1 to 3, the principle of a floor with a central region that is raised without (almost without) modifying the lateral floor supports being adaptable to suit numerous vehicle geometries.

The invention claimed is:

1. A motor vehicle chassis comprising:
   two lateral floor supports;
   a seat-cushion support part positioned between two lateral raisers fixed on top of the lateral floor supports and assembled with the lateral floor supports;
   two seat-cushion support reinforcers each assembled with one of the two lateral floor supports and with one of the two lateral raisers, each seat-cushion support reinforcer comprising:
   a substantially horizontal plate extending the scat-cushion support part laterally and assembled with the lateral raiser along a substantially vertical mating edge of the plate; and
   a single supporting leg extending downward from the plate, the single supporting leg including an assembly end assembled with the lateral floor support and positioned in vertical alignment with the plate a distance from a projection onto the horizontal of the mating edge.

2. The chassis as claimed in claim 1, in which at least one relief is configured to stiffen the edge of the plate run around an outline of the plate, and the mating edge has passing through it at least two assembly orifices allowing the plate to be assembled with one or more horizontal supports.

3. The chassis as claimed in claim 1, in which the plate is made of sheet metal, a periphery of the plate comprising at least one stiffening relief in a form of a turned-down edge and/or in a form of a pressed channel running around the periphery of the sheet.

4. The chassis as claimed in claim 3, in which the leg is made of sheet metal, a width of the leg reducing between the plate and the assembly end.

5. The chassis as claimed in claim 4, in which the leg is bent into an angle bracket shape, an upper part of the angle bracket shape being secured to a surface of the plate.

6. The chassis as claimed in claim 4, in which the leg includes a mean plane substantially parallel to a longitudinal median plane of the chassis, and the mating edge of the plate is substantially parallel to the mean plane of the leg.

7. The chassis as claimed in claim 1, in which the plate comprises a canted region that is superelevated with respect to a first mean plane of the plate along a line perpendicular to the mating edge.

8. The chassis as claimed in claim 1, in which each seat-cushion support reinforcer is assembled with the lateral raiser and with the lateral floor support by at least two bent sheet metal fittings, each including a pre-assembly first face configured to be secured to the lateral raiser or to the lateral floor support, and a second face, substantially perpendicular to the first face, configured to come into contact with a plane of the seat-cushion support reinforcer.

9. The chassis as claimed in claim 1, in which the plate includes a slot of a width greater than a width of a seat belt of the vehicle.

\* \* \* \* \*